Dec. 3, 1968      H. A. FULTON ET AL      3,414,005
UNIFIED PLASTIC BALLCOCK AND SILENCER
Filed July 27, 1966      2 Sheets-Sheet 1
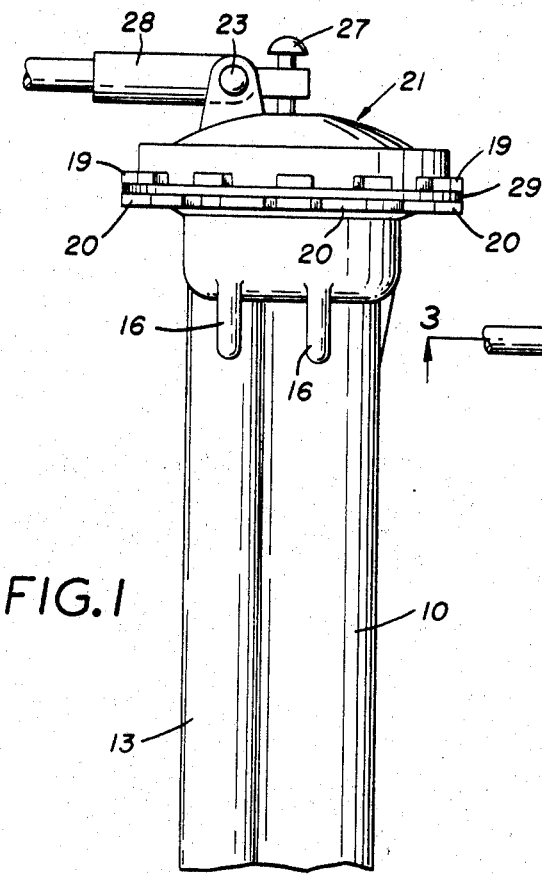
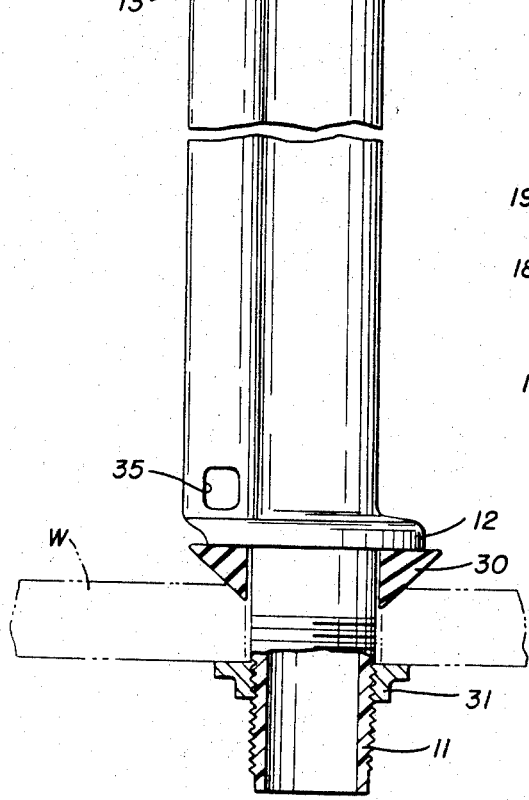
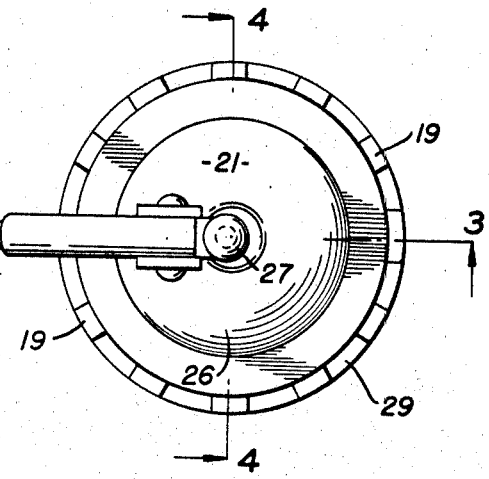
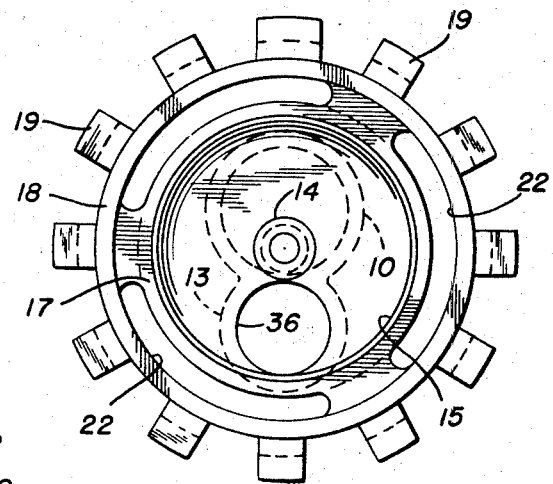
INVENTORS
HOWARD A. FULTON,
VAUGHN D. FLINNER, &
MILO G. SHEAFFER
ATTORNEYS Dec. 3, 1968    H. A. FULTON ETAL    3,414,005
UNIFIED PLASTIC BALLCOCK AND SILENCER
Filed July 27, 1966    2 Sheets-Sheet 2
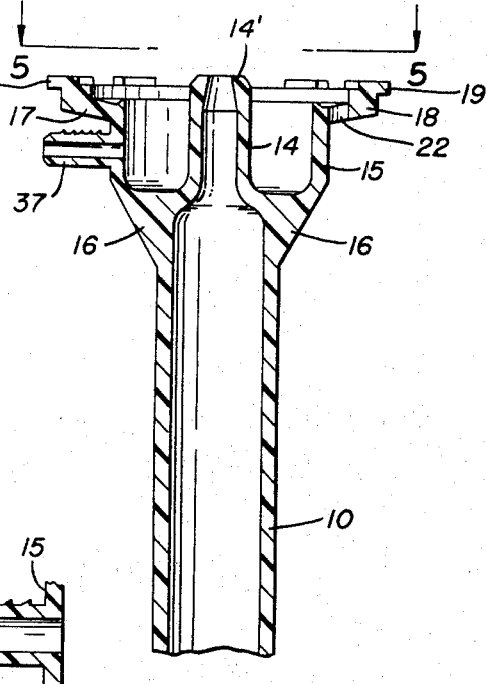
FIG. 4
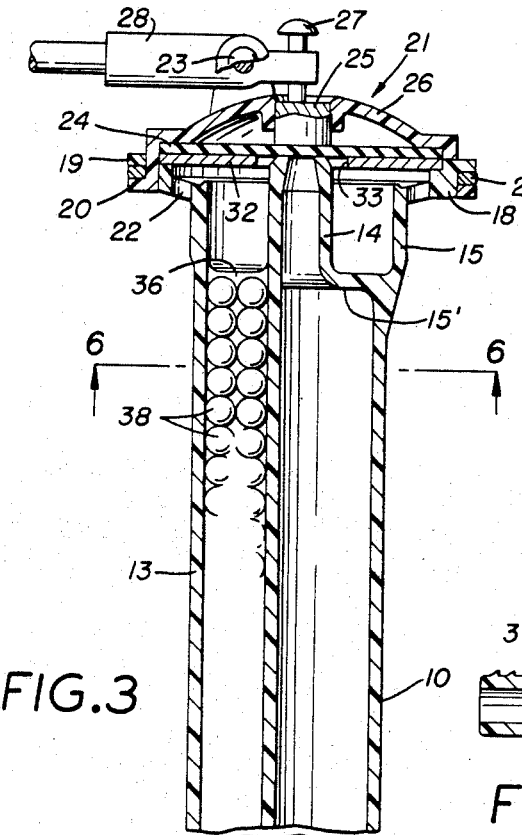
FIG. 3
FIG. 7
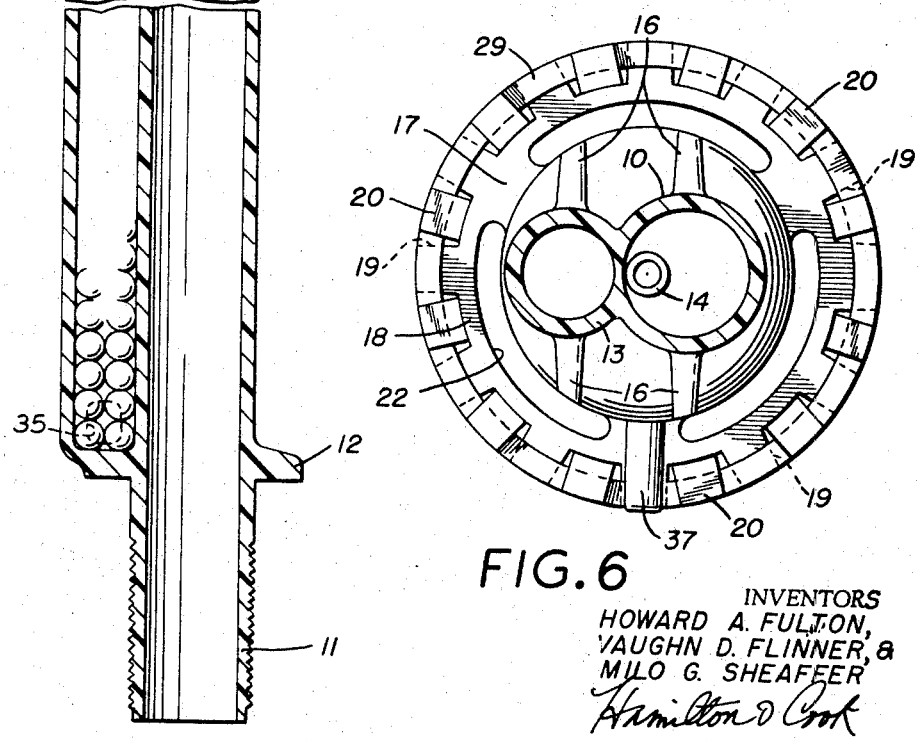
FIG. 6
INVENTORS
HOWARD A. FULTON,
VAUGHN D. FLINNER, &
MILO G. SHEAFFER
Hamilton D Cook
ATTORNEYS United States Patent Office 3,414,005
Patented Dec. 3, 1968

3,414,005
UNIFIED PLASTIC BALLCOCK AND
SILENCER
Howard A. Fulton, Perrysville, Vaughn D. Flinner, Big
Prairie, and Milo G. Sheaffer, Lakeville, Ohio, assignors to Mansfield Sanitary, Inc., Perrysville, Ohio,
a corporation of Ohio
Filed July 27, 1966, Ser. No. 568,228
11 Claims. (Cl. 137—436)

This invention relates generally to ballcocks for controlling the flow of water in flush tanks used in connection with toilet bowls, and more particularly to an improved unitary construction of a ballcock, inlet pipe and "hush tube" adapted for installation in a conventional flush tank.

Conventional ballcock assemblies originally consisted of a metal inlet tube connected at its lower end with a threaded shank passing in sealed relation through the bottom wall of the tank to connect with water supply pipe, and having a metal ballcock valve at the upper end of said inlet tube actuated by a lever arm and float, the outlet from the ballcock valve being a metal hush tube or silencer tube extending downwardly and terminating near the bottom of the tank so that its discharge end is covered as the tank begins to refill after flushing.

The connections between the several metal parts in such conventional assemblies are screwed connections which give rise to the difficulties of time of assembly, leakage due to corrosion and relative movement of the parts, and resistance to smooth flow at the interior of the joints. It has been proposed to substitute plastic tubes for the metal tubes to decrease corrosion, but the time of assembly and likelihood of leakage at the joints was substantially the same.

Furthermore, the hush tube whether metal or plastic did not function well as a silencer due to the velocity of flow through the tube. Applying screens to the hush tube outlet to retard the flow and reduce the noise did not prove practical, because the screens became clogged unless frequently cleaned, and the average person can not be expected to remove and clean screens inside the flush tank of a toilet.

It is a general object of the present invention to provide an improved unified ballcock, inlet tube and hush tube construction which will overcome the foregoing disadvantages.

A more specific object is to provide a reinforced unified plastic construction which can be molded in one piece, thereby eliminating the joints between separate parts.

Another object is to provide an integral inlet tube construction having a baffled flow path to slow down the inlet velocity.

A further object is to provide an improved noise-reducing passageway construction between the ballcock valve and the hush tube.

A still further object is to provide an integral hush tube having self-cleaning means for further reducing the flow noise.

These and other objects are accomplished by the improved construction comprising the present invention, a preferred embodiment of which is shown by way of example in the accompanying drawings and described in detail herein. Various modifications and changes in details of construction are encompassed within the scope of the appended claims.

In the drawings:

FIG. 1 is an elevational view showing the improved unified ballcock having a cap on its upper end and its lower end through and clamped to the bottom wall of a flush tank.

FIG. 2 is a top plan view thereof.

FIG. 3 is a vertical sectional view of the unified ballcock with the cap thereon, as on line 3—3 of FIG. 2.

FIG. 4 is a partial vertical section on line 4—4 of FIG. 2, with the cap removed.

FIG. 5 is an enlarged top plan view on line 5—5 of FIG. 4.

FIG. 6 is an enlarged cross section on line 6—6 of FIG. 3.

FIG. 7 is an enlarged portion of FIG. 4.

As best shown in FIGS. 3, 4 and 6, the improved unified ballcock comprises an elongated inlet tube 10 having a shank 11 and an abutment flange 12 at its lower end, and a parallel hush tube portion 13 integral with inlet tube 10. An offset inlet valve duct 14 having a top valve seating surface 14' connects with the upper end of inlet tube 10, and the upper end of hush tube 13 connects with an annular well portion 15 surrounding the inlet valve duct 14.

As shown in FIGS. 1 and 4, exterior reinforcing ribs 16 are preferably provided between the annular well portion 15 and the tubes 10 and 13.

The upper end of the well portion 15 has an outwardly extending annular flange 17 terminating in an outer ring or rim 18, and the ring 18 has a circumferential series of spaced-apart radially outwardly extending lugs 19 for cooperating with similarly spaced lugs 20 on a cap 21, preferably of plastic material. Spaced circumferential slots 22 are provided in the annular flange 17 for a purpose to be described.

The plastic material of the unified ballcock (and the cap) may be of polypropylene, or any other suitable plastic having sufficient strength and durability, which is adapted to be molded in one piece. The threaded shank 11 preferably has a thin metal sheath molded in place over the threads to reinforce the shank and provide metal appearance and feel.

The cap 21 has an annular recessed seating face for receiving a diaphragm gasket 24 the top side of which is abutted at its central portion by a plug 25 vertically slidable in the dome-shaped top wall 26 of the cap 21. The top of the plug 25 is engaged by a pin 27 screwed through the end of a lever arm 28 pivoted on the cap at 23. On the outer end of arm 28 is a conventional ball float (not shown). When the cap 21 is seated on the ring 18 with the lugs 20 extending downwardly between lugs 19, the cap may be held by a spring ring 29 inserted between lugs 19 and 20. Preferably, the surfaces of lugs 19 and 20 which engage the ring 29 are slightly tapered radially, so that any shrinking or depressing of the rubber gasket due to cold flow is compensated for by progressive tightening of spring ring 29.

As shown in FIG. 1, the ballcock assembly may be installed in a flush tank by passing the shank 11 through the bottom wall W of the tank, inserting a usual sealing gasket 30 between flange 12 and the tank wall, and screwing a lock nut 31 on the projecting part of the shank. The water supply line may then be coupled to the shank in a usual fashion.

When the water in the flush tank raises the float arm to the position shown the plug 25 holds the gasket 24 in sealing abutment with the top seating surface of inlet duct 14, shutting off the flow of incoming water from tube 10. When the water level drops due to flushing the tank, pressure on the plug is released, allowing the incoming water to raise the gasket 24 and open the valve.

A guard plate 32 is supported at its outer edge on a shoulder in the rim 18 and abuts the underside of the gasket 24. The guard plate 32 has a central aperture 33 surrounding the inlet duct 14 to allow incoming water to flow into the well 15 when the valve is open without splashing out of the slots 22. The slots 22 are antisiphon slots communicating with the atmosphere to prevent back flow through inlet tube 14 when the inlet valve is open and a vacuum occurs in the supply line.

The hush tube 13 preferably has laterally opposite discharge ports 35 at its lower end, and these are preferably directed away from the usual flush valve of the flush tank so as not to interfere with the seating of the flush valve. Moreover, the two ports 35 provide increased discharge area so as to slow down the flow of water through the hush tube 13 and minimize noise.

The inlet opening 36 at the top of the hush tube has a substantially greater area than the upper end of inlet duct 14 to further retard the flow into the hush tube. Novel self-cleaning means for regulating and reducing the noise due to flow through the hush tube comprises a plurality of relatively small balls 38 loosely packed in the hush tube. The balls 38 are preferably of a resilient material such as neoprene or the like, so as not to create noise by contact with each other and so as to aid in a self-cleaning action as the balls roll against each other. Not only do the balls 38 slow down and regulate the flow through hush tube 13, but they serve to reduce noise by balancing the harmonics in the tube.

In the operation of the improved ballcock, when the tank is flushed and the diaphragm 24 opens the inlet valve, the incoming water from tube 10 is deflected by the bottom wall 15' of the well 15, and flows into inlet duct 14. This creates a baffling effect and builds up eddy friction to slow down flow into the duct. The water then flows into the relatively large well 15 from which it flows freely into the top of the hush tube, the inlet 36 of which is substantially larger than the outlet from duct 14, insuring reduced velocity of flow. As the water then flows through the tube 13, the balls regulate the flow and greatly reduce noise by balancing harmonics, as previously described.

The tubular stub 37 projecting from the side of well 15 is preferably serrated as shown for connection to the usual refill tube (not shown) which conducts some water to the toilet bowl as the tank is filling, to maintain a small reservoir in the bowl to prevent the escape of gases from the waste line.

By molding the inlet tube and hush tube in one piece, the two tubes reinforce each other and the necessity for any joints between the two tubes is eliminated. The improved unified plastic construction is inherently quieter than a metal construction and eliminates corrosion as a result of exposure to or submersion in water. The unified plastic construction is rapid and economical to manufacture and requires little or no maintenance or replacement parts.

What is claimed is:

1. Unified plastic ballcock construction comprising an inlet tube and an integral hush tube in parallel side-by-side relation therewith and having an outlet at one end and an inlet at the other end, an annular well connected to and communicating with said hush tube inlet, and a valve inlet duct surrounded by said well and communicating at one end with the end of said inlet tube in offset relation thereto, said valve inlet duct having a valve seat on its other end the port area of which is substantially less than that of the hush tube inlet.

2. Unified plastic ballcock construction as defined in claim 1, in which the annular well has a radially outwardly directed flange terminating in an outer rim, and said flange is provided with anti-siphon openings.

3. Unified plastic ballcock construction as defined in claim 1, in which the annular well has a radially outwardly directed flange terminating in an outer rim having circumferentially spaced lugs adapted for interfitting spaced lugs on a closure cap.

4. Unified plastic ballcock construction as defined in claim 2, in which the annular well has a radially outwardly directed flange terminating in an outer rim having circumferentially spaced lugs adapted for interfitting spaced lugs on a closure cap.

5. Unified plastic ballcock construction as defined in claim 2, in which said rim has an annular shoulder for receiving a guard plate having a central opening surrounding the valve inlet duct, said guard plate adapted to support a sealing gasket for sealing against said valve seat.

6. Unified plastic ballcock construction as defined in claim 5, in which said rim has circumferentially spaced radially outwardly extending lugs adapted for interfitting spaced lugs on a closure cap.

7. Unified plastic ballcock construction as defined in claim 1, in which the hush tube is substantially filled with a multiplicity of loosely packed resilient balls in rolling contact with each other.

8. Unified plastic ballcock construction as defined in claim 3, in which the hush tube is substantially filled with a multiplicity of loosely packed resilient balls in rolling contact with each other.

9. Unified plastic ballcock construction as defined in claim 5, in which the hush tube is substantially filled with a multiplicity of loosely packed resilient balls in rolling contact with each other.

10. Unified plastic ballcock construction as defined in claim 7, in which the outlet end of said hush tube has laterally directed outlets opposite each other.

11. A unified plastic ballcock assembly comprising an inlet tube and an integral hush tube in parallel side-by-side relation therewith and having an outlet at one end and an inlet at the other end, an annular well connected to and communicating with said hush tube inlet, and a valve inlet duct surrounded by said well and communicating at one end with the end of said inlet tube in offset relation thereto, said valve inlet duct having a valve seat on its other end, said annular well having a radially outwardly directed flange terminating in an outer rim, circumferentially spaced lugs on said rim, a plastic cap fitting on said rim, means to lock said cap on said rim, a gasket in said cap for sealing against said valve seat on said valve inlet duct, and float arm means on said cap for selectively pressing said gasket against said valve seat.

References Cited

UNITED STATES PATENTS

| 1,338,179 | 4/1920  | Hohmeister | 137—437 X |
| 1,377,883 | 5/1921  | Grosvold   | 251—118   |
| 2,635,622 | 4/1953  | Owens      | 137—437 X |
| 3,086,546 | 4/1963  | Brown      | 137—436   |
| 3,109,447 | 11/1963 | Jacobson   | 137—436   |
| 3,207,170 | 9/1965  | Fulton     | 137—436 X |

FOREIGN PATENTS 238,485   2/1961   Australia.

M. CARY NELSON, *Primary Examiner.*

R. C. MILLER, *Assistant Examiner.*